(12) United States Patent
McDougal et al.

(10) Patent No.: US 8,958,636 B1
(45) Date of Patent: Feb. 17, 2015

(54) CONFIGURABLE COLOR TRAPPING

(75) Inventors: Jay McDougal, Corvallis, OR (US); Douglas G. Keithley, Boise, ID (US)

(73) Assignee: Marvell International Ltd., Hamilton (BM)

( * ) Notice: Subject to any disclaimer, the term of this patent is extended or adjusted under 35 U.S.C. 154(b) by 837 days.

(21) Appl. No.: 13/191,379

(22) Filed: Jul. 26, 2011

Related U.S. Application Data

(60) Provisional application No. 61/368,464, filed on Jul. 28, 2010.

(51) Int. Cl.
*G06K 9/00* (2006.01)

(52) U.S. Cl.
USPC .................................................. 382/167

(58) Field of Classification Search
None
See application file for complete search history.

(56) References Cited

U.S. PATENT DOCUMENTS

| | | | |
|---|---|---|---|
| 5,818,975 A | 10/1998 | Goodwin et al. | |
| 6,115,104 A | 9/2000 | Nakatsuka | |
| 6,341,020 B1* | 1/2002 | Rumph et al. | 358/1.9 |
| 6,377,711 B1* | 4/2002 | Morgana | 382/274 |
| 7,006,668 B2 | 2/2006 | Iguchi et al. | |
| 7,072,523 B2 | 7/2006 | Bolle et al. | |
| 7,146,059 B1 | 12/2006 | Durand et al. | |
| 7,280,705 B1 | 10/2007 | Frank et al. | |
| 7,539,342 B2 | 5/2009 | Tabata et al. | |
| 7,672,515 B2* | 3/2010 | Lin et al. | 382/199 |
| 7,738,727 B2 | 6/2010 | Chang et al. | |
| 7,756,408 B2 | 7/2010 | Ito et al. | |
| 7,830,566 B2 | 11/2010 | Yamada et al. | |
| 7,969,456 B2 | 6/2011 | Brown Elliott et al. | |
| 7,999,858 B2 | 8/2011 | Nayar et al. | |
| 8,379,274 B2* | 2/2013 | Tamura | 358/3.27 |
| 8,547,595 B2* | 10/2013 | Sakamoto | 358/1.9 |
| 8,705,136 B2* | 4/2014 | Jorgens et al. | 358/3.26 |
| 2001/0007599 A1 | 7/2001 | Iguchi et al. | |
| 2001/0033686 A1* | 10/2001 | Klassen | 382/167 |
| 2001/0055130 A1* | 12/2001 | Geurts et al. | 358/530 |
| 2002/0080247 A1 | 6/2002 | Takahashi et al. | |
| 2002/0135743 A1 | 9/2002 | Gindele | |
| 2003/0048362 A1 | 3/2003 | Watanabe et al. | |
| 2004/0095590 A1* | 5/2004 | Megawa et al. | 358/1.9 |
| 2005/0100242 A1 | 5/2005 | Trifonov et al. | |
| 2005/0169533 A1 | 8/2005 | Paragyios | |
| 2005/0243347 A1 | 11/2005 | Hayaishi | |
| 2006/0007496 A1* | 1/2006 | McElvain | 358/3.27 |
| 2007/0032886 A1 | 2/2007 | Tsai | |
| 2007/0206939 A1 | 9/2007 | Ito et al. | |
| 2007/0223814 A1 | 9/2007 | Chang et al. | |
| 2008/0007752 A1* | 1/2008 | Gandhi et al. | 358/1.9 |
| 2008/0130028 A1* | 6/2008 | Joergens et al. | 358/1.9 |
| 2008/0158614 A1* | 7/2008 | Segawa | 358/3.29 |
| 2010/0238468 A1* | 9/2010 | Eguchi | 358/1.9 |
| 2011/0211209 A1* | 9/2011 | Eguchi | 358/1.9 |

* cited by examiner

*Primary Examiner* — Sean Motsinger

(57) ABSTRACT

Embodiments of the present disclosure provide a method of color trapping to improve perceived image quality. The color trapping may be subject to one or more configurable parameters, to accommodate differences in printing processes and conditions.

23 Claims, 5 Drawing Sheets

CONFIGURABLE COLOR TRAPPING

CROSS REFERENCE TO RELATED APPLICATIONS

The present disclosure claims priority to U.S. Patent Application No. 61/368,464, filed Jul. 28, 2010, the entire specification of which is hereby incorporated by reference in its entirety for all purposes.

TECHNICAL FIELD

Embodiments of the present disclosure relate to the field of printing, and in particular, to the field of color trapping in printed images.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

A color printer typically implements a multiple-color process to reproduce an image in color. For example, a four-color process generally includes the use of four color planes including inks (or toners) of cyan (C), magenta (M), yellow (Y), and key (K), and a six-color process generally adds orange and green to the traditional CMYK inks. During printing of a color image, a mechanical misalignment (or misregistration) of color planes within a printing mechanism can occur. A misalignment of color planes can cause noticeable artifacts such as a halo or white gap in a printed image.

Color trapping is a method for minimizing artifacts caused by a mechanical misalignment of color planes in a printing mechanism. Color trapping typically involves expanding lighter color regions, so that the lighter color regions are "trapped" under darker-colored regions along color edges. This trapping can reduce or eliminate the perceived image quality degradation associated with misregistration of color planes within a printing mechanism.

FIGS. 1a, 1b, 1c, and 1d illustrate the concepts of color trapping. FIG. 1a shows two regions A and B of different color planes that are to be printed adjacent each other. The boundary 102 between the two regions is referred to as a color edge.

FIG. 1b shows how regions A and B might appear if the color plane associated with region B suffers from horizontal misalignment. Because of the misalignment, a very visible gap 104 may appear between the two color regions.

FIG. 1c shows the results of color trapping in the situation in which there is no relative misalignment of color planes. Region A has been grown to extend into region B, resulting in an overlapping region 106. The color trapping is typically performed so that the overlapping region 106 is not noticeable or only minimally noticeable, by expanding light color regions into darker color regions. This minimizes the visual impact of the trapping, taking advantage of the fact that a lighter color is typically dominated by any overlying darker color.

FIG. 1d shows the result of color trapping in the situation where the toner plane associated with region B suffers from the same horizontal misalignment as illustrated in FIG. 1b. In this case, the gap between the two regions does not occur because of the color trapping. Depending on the degree of misalignment, some portion of the overlap 106 may or may not remain.

SUMMARY

In accordance with various embodiments of the present disclosure, there is provided a method of color trapping in situations where there may be misalignment between individual color planes of a printing mechanism. The method utilizes a number of parameters that may be configured or tailored for different conditions and print jobs. The parameters can be used to adjust for different user preferences, paper types, ink types, and/or toners. The parameters may also be adjusted to account or compensate for non-linear human perceptions of color intensities, and to accommodate special situations generated by certain types of images, image data, paper, inks, toners, and other printing variables.

After identifying a color edge within an image, individual target pixels along the color edge may be analyzed to determine whether they should trap neighboring pixels that are on the opposite side of the color edge. For example, trapping may be performed when the intensity of a target pixel is greater than that of a neighboring pixel. In some embodiments, trapping may also be performed when the intensity of the target pixel is less than that of the adjacent pixel by no more than a relatively small threshold amount.

When trapping in a target pixel, a possible trapping amount may be calculated based on the neighboring pixel or on differences between the target pixel and the neighboring pixel. The possible trapping amount may indicate a color and/or an intensity that is to be added to the target pixel. The possible trapping amount may be limited or scaled based on one or more factors or parameters that are configured prior to printing the image. These factors or parameters may include a maximum absolute trapping amount and a maximum relative trapping amount, as well as the threshold amount mentioned above.

In order to compare neighboring pixels, their component color magnitudes may be transformed and summed. Transformations may include non-linear transformations that account or compensate for human perceptions of intensity. Transformations may also account for differences in human preferences, differences in papers, inks, and toners, and other differences that may occur in printing processes.

Calculated trapping amounts may also be transformed prior to their application, using transformations that improve image perception. For example, a non-linear transformation function having a continuously increasing slope, such as a square-law function, may be used to transform trapping intensities prior to adding such trapping intensities to the intensities of the target pixels.

The described techniques may be implemented as a system-on-chip (SOC) for use within a data pipeline of a printing process. Such an SOC may utilize look-up tables corresponding to each of the available color planes, to perform non-linear transformations on the color magnitudes of the different color planes prior to summing them to produce composite pixel intensities. An SOC may also utilize a look-up table to provide the described transformations of calculated trapping intensities.

The described techniques may further be implemented by printers, imaging processing software, and other components in which it may be desired to reduce the perceptual impact of color plane misregistration.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Embodiments of the disclosure are illustrated by way of example and not by way of limitation in the figures of the accompanying drawings.

DETAILED DESCRIPTION

Figure 1A:
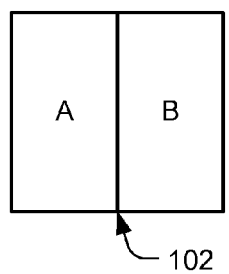
FIGS. 1a-1d illustrate adjacent color regions and the potential effects of color trapping within those regions.
Figure 1B:
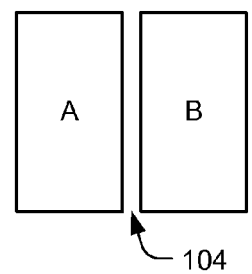
Figure 1C:
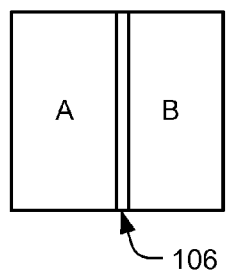
Figure 1D:
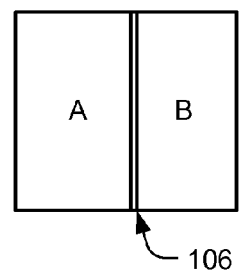
Figure 2:
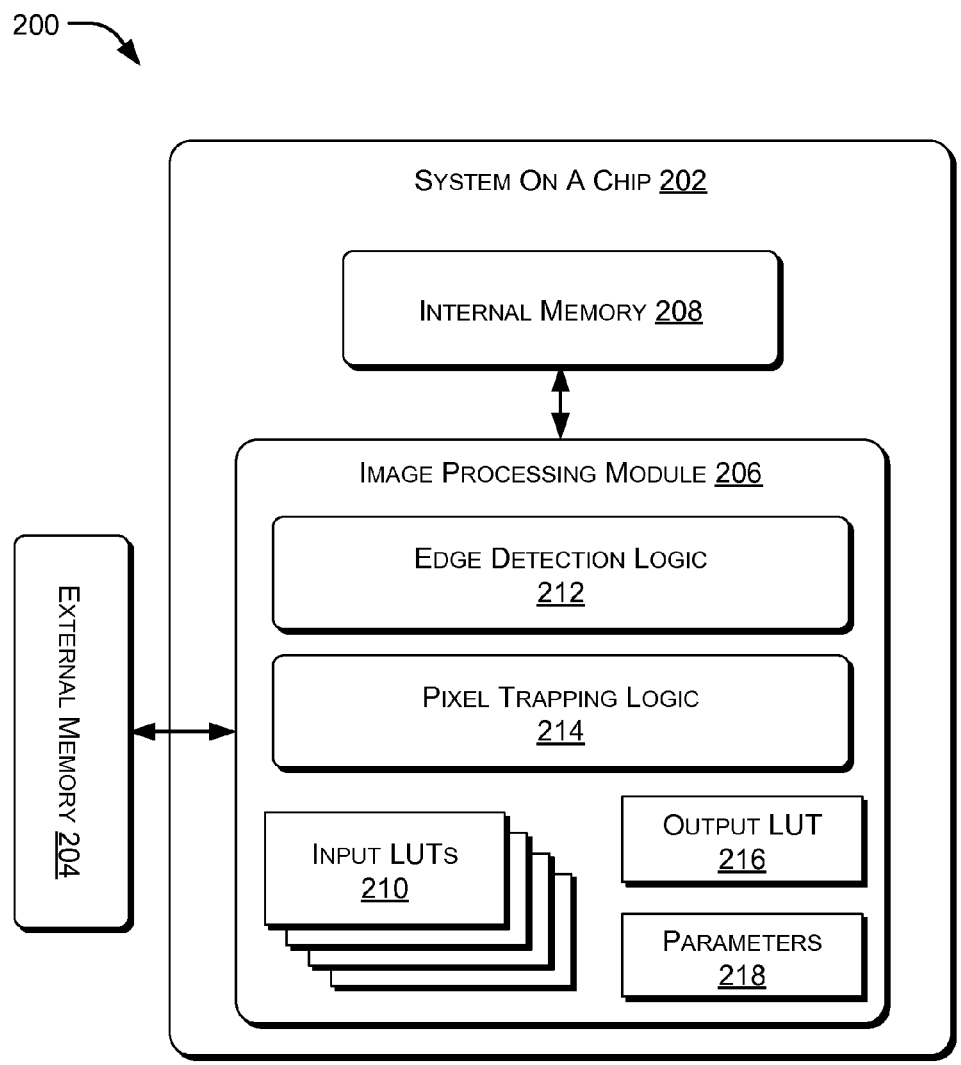
FIG. 2 is a block diagram of an image processing system in which the techniques of the present disclosure may be implemented.

FIG. 2 illustrates an image processing system 200 (generally referred to herein as system 200), in accordance with various embodiments of the present disclosure. The system 200 includes a system-on-chip (SOC) 202 and an external memory 204 (e.g., memory that is external to the SOC 202). In various embodiments, the external memory 204 comprises a double data rate synchronous dynamic random access memory (DDR SDRAM), although the external memory 204 can be any appropriate type of memory.

The SOC 202 comprises an image processing module 206 and an internal memory 208. The internal memory 208 is, for example, a random access memory (RAM), e.g., a static random access memory (SRAM). The image processing module 206 may comprise one or more component intensity input transformation look-up tables (LUTs) 210, edge detection logic 212, color or pixel trapping logic 214, and one or more output transformation look-up tables (LUTs) 216. In addition, the SOC 202 may store a plurality of configurable variables or parameters 218. The parameters 218 may be stored in the internal memory 208, the external memory 204, or by other means.

The system 200 (e.g., image processing module 206) is configured to process one or more images. For example, the SOC 202 may be associated with any appropriate image processing system, e.g., a printing system, a display system, an image rendering system, and/or the like. The SOC 202 may be capable of various types of image processing, such as generating halftone images, removing artifacts from the images, enhancing the images, rendering the images for printing or display, etc. The techniques below relate to color-based trapping of pixels within an image, which may be performed by the SOC 202 either alone or on conjunction with other types of image processing.

Figure 3:
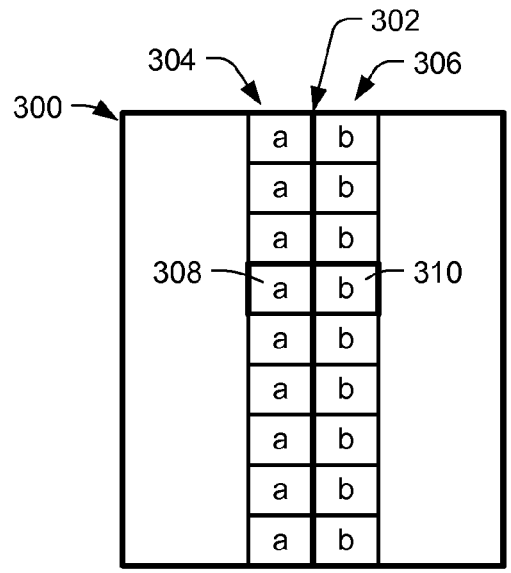
FIG. 3 illustrates a color edge and pixels along such a color edge that may be subject to color trapping in accordance with the present disclosure.

FIG. 3 represents a portion of an image 300 containing a color edge 302 that is a candidate for color trapping by the image processing module 206. The color edge 302 has what will be referred to as a first side 304 and a second side 306. Along each side of the color edge 302 lies a row or sequence of pixels, labeled in FIG. 3 as either "a" or "b". The "a" pixels lie along the first side 304 of the color edge 302. The "b" pixels lie along the second side 306 of the color edge 302. Note that although the color edge 302 is illustrated as a straight line having contiguous pixels along each side, color edges may in fact be curved, irregular, and discontinuous, and may be defined by irregular arrays or sequences of pixels.

In the example of FIG. 3, a first pixel 308 and a second pixel 310 have been identified as examples of pixels on opposite sides of the color edge 302. The first pixel 308, which will also be referred to as a target pixel in the following discussion, is along the first side 304 of the color edge 302. The second pixel 310, which will also be referred to as a neighboring pixel in the following discussion, is along the second side 306 of the color edge 302.

Target pixel 308 and neighboring pixel 310 will be referenced in the following discussion to explain various techniques related to color trapping. Generally, each pixel along a color edge will be examined to determine whether a neighboring pixel, on the opposite side of the color edge, should be trapped. The pixel currently being examined will be referred to as the target pixel. The pixel subject to trapping beneath the target pixel will be referred to as the neighboring pixel. Note that the neighboring pixel may be immediately adjacent the target pixel, or may, in certain embodiments, be within a specified or configurable distance of the target pixel, such as within 2 or 3 pixels of the target pixel. Furthermore, the target pixels may be immediately adjacent the color edge, or may be a configurable number of pixels from the color edge. For example, trapping may be performed with respect to pixels that are up to 2 or more pixels away from the color edge.

In the described embodiments, color trapping is based primarily on color intensities of the target pixel and the neighboring pixel. The definition of intensity is made flexible by using lookup tables (LUTs) 210 to define the intensity of various magnitudes of the individual C, M, Y, and K color planes. In this context, "intensity" is considered to be the perceived "darkness" of a color. Thus, a darker color corresponds to a higher intensity. In general, lower intensity colors on one side of an edge are added to the higher intensity colors on the other side of the edge to "trap" the lighter color under the darker color.

Figure 4:
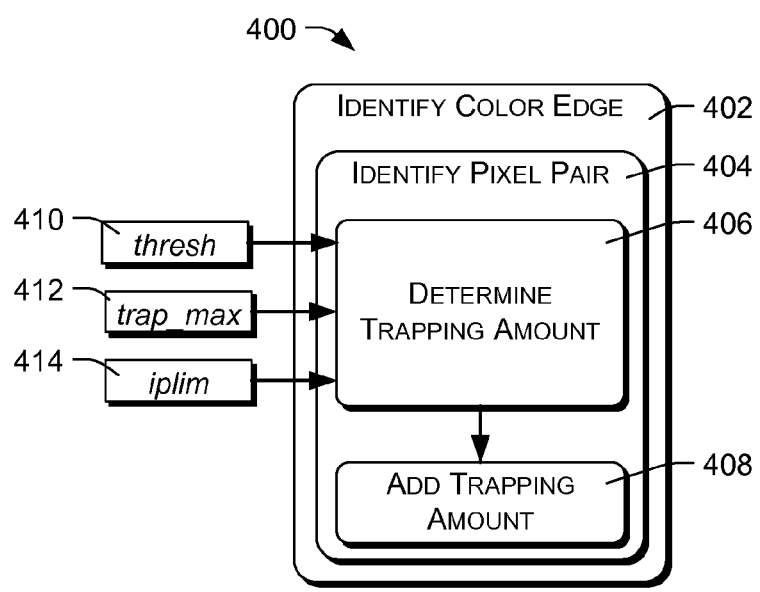
FIGS. 4-6 are flowcharts illustrating methods of color trapping in accordance with the present disclosure
Figure 5:
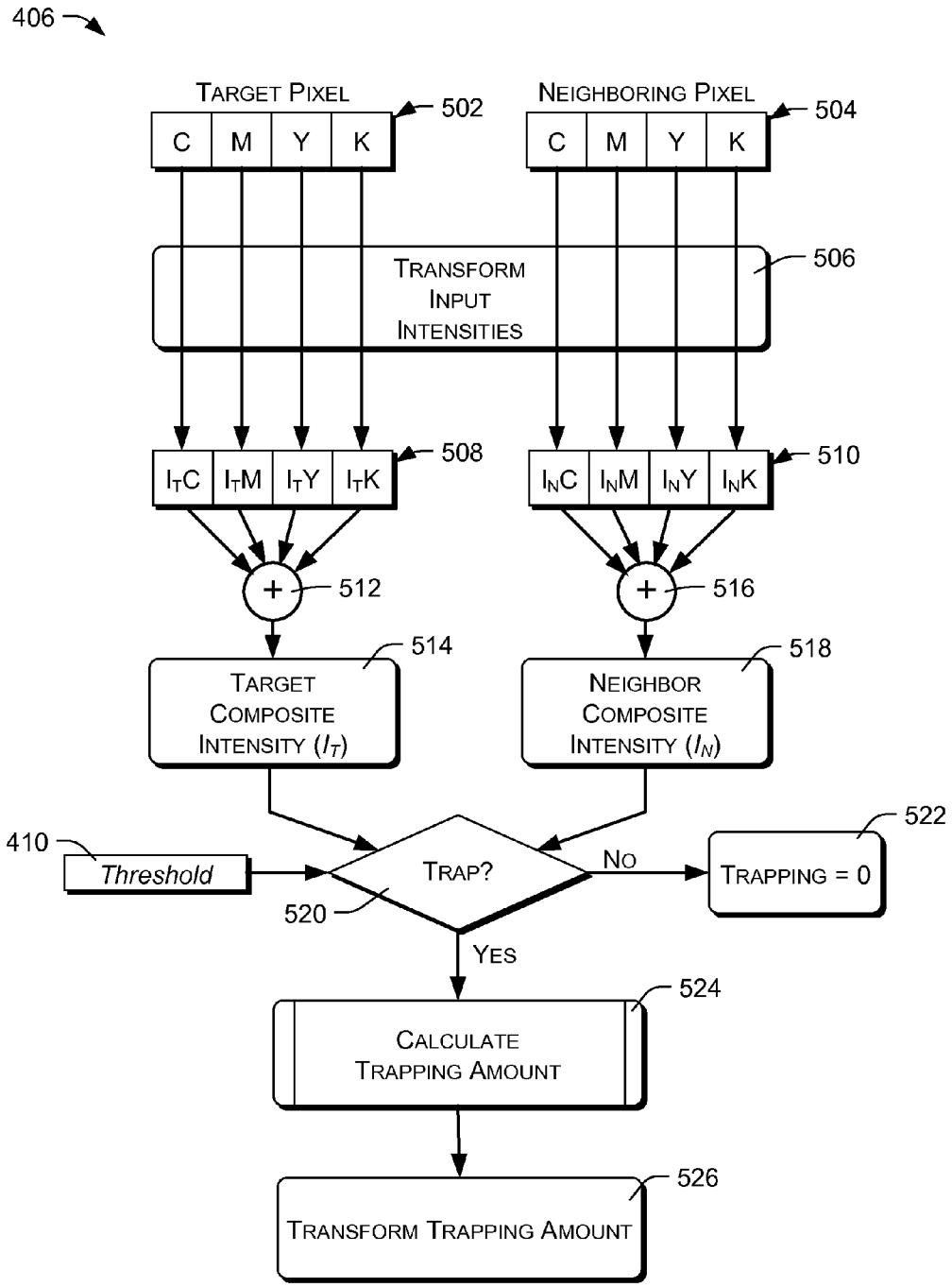
Figure 6:
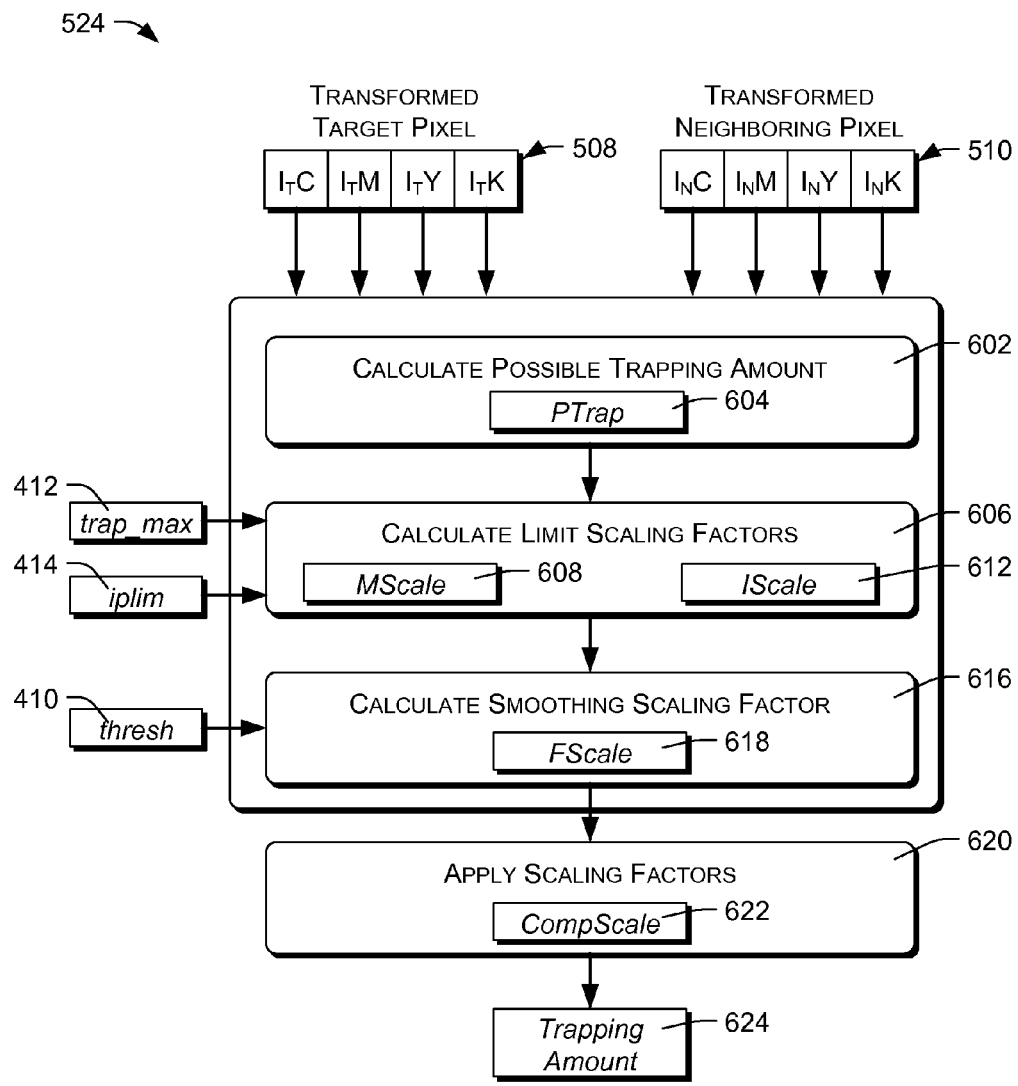

FIGS. 4-6 illustrate an example method 400 of color trapping in accordance with various embodiments. Note that some embodiments may implement only a subset of the actions, steps, and/or techniques that are described below.

FIG. 4 shows high-level actions that are generally performed in the example method 400. An action 402 comprises identifying a color edge within an image. Existing techniques can be used to identify such a color edge. The action 402 may be performed multiple times, to identify multiple color edges within an image. The actions illustrated within block 402 are executed for each of the identified color edges.

For an identified color edge, an action 404 is performed, comprising identifying a pair of pixels along the color edge. The pair of pixels includes a target pixel and a neighboring pixel, as explained above. In one embodiment, the action 404 of identifying edge pixel pairs is performed multiple times, to identify each pair of target and neighboring pixels along the color edge. One pixel of the identified pair is considered the target pixel, and the actions within the block 404 are performed with respect to each edge pixel so that each edge pixel is eventually evaluated as a target pixel.

An action 406 comprises determining a trapping amount for the target pixel. Generally, this action is performed with reference to one or more neighboring pixels—pixels on the opposite side of the color edge but within a certain distance or number of pixels from the current target pixel. For example, pixels within a distance of 1 or 2 pixels may be considered neighboring pixels, and may be trapped within or under the target pixel. The maximum pixel distance between target and neighboring pixels may be a configurable parameter.

An action 408 comprises adding the determined trapping amount to the target pixel. In some embodiments, this may comprise adding a calculated intensity to the target pixel, wherein the calculated intensity is related to the intensity of the one or more neighboring pixels.

Further details regarding actions 406 and 408 will be described with reference to FIGS. 5 and 6. Generally, the action 406 of determining the trapping amount is performed based on one or more configurable parameters, which may be a part of the parameters 218 of FIG. 2. In the various embodiments, these configurable parameters include an intensity threshold (thresh) 410, a maximum absolute trapping amount (trap_max) 412, and a maximum relative trapping amount (iplim) 414.

The intensity threshold thresh is used in determining whether or not trapping should be performed, particularly in the situation where the neighboring pixel has a higher intensity than the target pixel. In particular, the configurable intensity threshold allows pixels with similar intensities to be trapped under each other. Thus, trapping may occur under both sides of a color edge where the intensities on both sides are only slightly different. If the difference in intensities is within the threshold, then the amount of trapping is calculated as a portion of the difference between the target pixel intensity and the neighboring pixel intensity. If the neighboring pixel's intensity is higher than that of the target pixel by more than the intensity threshold, then no trapping occurs.

When trapping does occur, the maximum absolute trapping amount trap_max is used to limit the trapping amount or intensity to a configurable absolute value. This configurable parameter specifies an upper limit on the amount of trapping, to avoid putting too much ink or toner on the media.

The maximum relative trapping amount iplim is used to further limit the trapping amount or intensity to a configurable relative value, which may be a fraction or percentage of the target pixel's original intensity. The parameter iplim may be a fraction between 0 and 1 or a percentage between 0% and 100%, relative to the original intensity of the target pixel. It allows a perception-based balancing of the tradeoff between the increase in intensity in overlapping regions, and the potential lack of color in gaps between regions. It is implemented as a fraction or percentage because the human visual system is most sensitive to the relative difference in colors.

In addition, the eventual trapping amount or intensity may be scaled by a smoothing parameter. In various embodiments, such a smoothing parameter is applied when the intensity of the neighboring pixel is greater than that of the target pixel but the intensity difference between the target and neighboring pixel is no greater than the intensity threshold thresh. This is useful when a slowly changing edge intensity causes trapping to switch from one side of a color edge to the other. To enable a smooth variation from full trapping to partial trapping, the amount of trapping can be controlled as a percentage of the edge intensity difference and the intensity threshold thresh.

FIG. 5 illustrates details of the action 406, which comprises determining a trapping amount for an identified target pixel along a color edge. In the described embodiment, the target pixel is defined by component magnitudes 502 corresponding to multiple color planes, in this case the C, M, Y, and K color planes. A neighboring pixel is similarly represented by component magnitudes 504 corresponding to the multiple color planes C, M, Y, and K.

An action 506 comprises transforming each of the component magnitudes of the target and neighboring pixels. This action may be performed by the input lookup tables 210 of FIG. 2, which may correspond respectively to each of the C, M, Y, and K color planes. Thus, the component magnitudes of each color plane may be transformed differently and independently of each other.

The transformations performed in the action 506 may be linear or non-linear transformations, selected to account for differing human perceptions of intensity with regard to different colors and color magnitudes. For example, increasing color magnitude in one color plane might be perceived to be more significant than the same increasing magnitude in another color plane. Thus, an example set of color plane transformations might weight the different color planes disproportionally. Some implementations may implement the lookup tables 210 to achieve the following color plane weighting:

$$I=0.3*C+0.59*M+0.11*Y+1.0*K$$

where C, M, Y, and K are the original component intensity values and I is the composite intensity.

The lookup tables may alternatively be configured to implement non-linear transformations for one or more of the color planes. Specifically, the input lookup tables 210 generally allow for various types of non-linear transformations so that trapping can be configured to cover a wide variety of ink or toner types and colors, and can be adjusted for differences in human perceptions of colors.

The action 506 of transforming the component magnitudes of the target and neighboring pixel results in component intensities 508 and 510, corresponding respectively to the target pixel and the neighboring pixel. For purposes of discussion, the variables $I_T C$, $I_T M$, $I_T Y$, and $I_T K$ will be used to indicate the individual component intensities 508 of the target pixel in the C, M, Y, and K color planes, respectively. The variables $I_N C$, $I_N M$, $I_N Y$, and $I_N K$ will be used to indicate the individual component intensities 510 of the neighboring pixel in the C, M, Y, and K color planes, respectively.

At 512, the transformed target pixel component intensities 508 are summed to produce a target composite intensity value ($I_T$) 514. At 516, the transformed neighboring pixel component intensities 510 are summed to produce a neighbor composite intensity ($I_N$) 518. Specifically, $I_T$ is the sum of the transformed component intensities $I_T C$, $I_T M$, $I_T Y$, and $I_T K$; $I_N$ is the sum of the transformed component intensities $I_N C$, $I_N M$, $I_N Y$, and $I_N K$.

An action 520 comprises comparing the target and neighbor composite intensities 514 and 518 to determine whether trapping should occur—whether the neighbor pixel should be trapped beneath the target pixel. In certain embodiments, the action 520 comprises evaluating whether the composite intensity 514 of the target pixel is greater than the composite intensity 518 of the neighboring pixel. If so, trapping will occur and the result of the action 520 is "yes" or "true." Otherwise, if the composite intensity 514 of the target pixel is equal to or not greater than the composite intensity 518 of the neighboring pixel, the result of the action 520 is "no" or "false" and trapping will not occur.

In certain embodiments, the result of the action 520 may additionally be considered "yes" or "true" if the composite intensity 514 of the target pixel is not greater than the composite intensity 518 of the neighboring pixel, but the difference between these two composite intensities is within the configurable threshold (thresh) 410. Thus, trapping may occur if the neighboring pixel is darker than the target pixel by no more than a small amount. The configurable threshold thresh allows two slightly differing pixels to be considered equal for purposes of determining whether trapping should occur, and trapping may occur where the intensities of two pixels vary only slightly. This also allows trapping to occur on both sides of a color edge in certain situations.

If the result of the action 520 is "no" or "false," indicating that trapping will not be performed, an action 522 is performed of setting the trapping amount to zero.

If the result of the action 520 is "yes" or "true," indicating that trapping will be performed, an action 524 is performed of calculating a trapping amount. The trapping amount in the described embodiment is an intensity that is to be added to the existing intensity of the target pixel. The trapping intensity may be calculated based on the transformed intensity of the neighboring pixel and other factors, some of which may be configurable. Furthermore, the trapping amount or intensity may be calculated as a relative percentage or factor, rather than as an absolute value. Calculation of the trapping amount will be described below with reference to FIG. 6.

After calculating the trapping amount at 524, an action 526 is performed of transforming the calculated trapping amount. The calculated trapping amount may be transformed in accordance with linear or non-linear functions to account for various printing conditions and other factors such as certain types of color data. In some embodiments, the calculated trapping amount is transformed based on a square-law function or some other function having an increasing or non-linear slope. A configurable lookup table may be used to perform the transformation. For example, the output lookup table 216 of FIG. 1 may be used to perform this transformation.

The transformed trapping amount is used in the action 408 of FIG. 4, where it is added to the edge or target pixel. In the described embodiment, the transformed trapping amount is returned as a percentage or other multiplicative factor by which each component intensity of the target pixel is multiplied. In this case, the action 408 of FIG. 4 comprises multiplying each component intensity value of the target pixel by the returned multiplicative factor.

FIG. 6 shows an example implementation of the action 524, which comprises calculating a trapping amount in the case where trapping is to be performed between a target pixel and a neighboring pixel. As illustrated, several elements of the calculation are based at least in part on one or both of the target and neighboring pixel component intensities 508 and 510.

An action 602 comprises calculating a possible trapping amount (PTrap) 604, based at least in part on the target and neighboring pixel component intensities 508 and 510. The possible trapping amount PTrap is calculated as the sum of possible color plane trapping amounts for each of the C, M, Y, and K color planes (referred to as PTrapC, PTrapM, PTrapY, and PTrapK, respectively). In turn, the possible color plane trapping amount corresponding to a given color plane is defined as the maximum of (a) zero and (b) the component intensity in the given color plane of the neighboring pixel minus the component intensity in the given color plane of the target pixel. Thus, the color plane trapping amount for a particular color plane is zero when the component intensity of the target pixel in that color plane is greater than that of the neighboring pixel.

More specifically, the possible color plane trapping amounts are calculated as follows:

$PTrapC = \max(0, I_N C - I_T C)$ $PTrapM = \max(0, I_N M - I_T M)$ $PTrapY = \max(0, I_N Y - I_T Y)$ $PTrapK = \max(0, I_N K - I_T K)$ where max(a,b) is a function that returns the maximum of its arguments a and b.

The composite possible trapping amount PTrap is calculated as the sum of the possible color plane trapping amounts:

$PTrap = PTrapC + PTrapM + PTrapY + PTrapK$

Several scaling amounts or factors are also calculated, to be used in scaling, limiting, or modifying the possible trapping amount PTrap. An action 606 comprises calculating a maximum scaling factor or parameter (MScale) 608 that is based at least in part on the specified maximum absolute trapping amount trap_max, and an intensity scaling factor or parameter (IScale) 612 that is based at least in part on the specified maximum relative trapping amount iplim. The configurable variable iplim is specified as a percentage, to be evaluated relative to the composite intensity $I_T$ of the target pixel. An action 616 comprises calculating a full scaling parameter (FScale) 618 that is based at least in part on the difference between the composite intensities $I_T$ and $I_N$ of the target and neighboring pixels, respectively.

More specifically, the maximum scaling factor MScale is calculated as follows: if the possible trapping amount PTrap is greater than the specified absolute trapping amount trap_max, MScale is set to the specified maximum trapping amount max_trap divided by the possible trapping amount PTrap (max_trap/Ptrap); otherwise, if the possible trapping amount PTrap is not greater than the specified absolute trapping amount trap_max, MScale is set to the value 1.

The intensity scaling parameter IScale is calculated as follows: if the composite intensity $I_N$ of the neighboring pixel is greater than the specified maximum relative trapping amount iplim of the composite intensity $I_T$ of the target pixel (i.e., if $I_N$>iplim*$I_T$), the intensity scaling parameter IScale is set to the specified relative maximum trapping amount iplim of the composite intensity $I_T$ of the target pixel divided by the composite intensity $I_N$ of the neighboring pixel (iplim*$I_T$/$I_N$); otherwise, if the composite intensity $I_N$ is less than the specified relative maximum trapping amount iplim of the composite intensity $I_N$ (i.e., if $I_N$<iplim*$I_T$), IScale is set to the value 1.

The full scaling parameter FScale is calculated as follows: if the composite intensity of $I_T$ of the target pixel is less than the composite intensity $I_N$ of the neighboring pixel, FScale is set to the difference between the composite intensities of the neighboring and target composite intensities $I_N$ and $I_T$, divided by the threshold thresh (($I_T$-$I_N$)/thresh); otherwise, if the composite intensity $I_T$ of the target pixel is equal to or greater than the second composite intensity $I_N$, FScale is set to the value 1.

An action 620 comprises applying the scaling factors calculated above. In certain embodiments, the action 620 comprises scaling the possible trapping amount PTrap by the smaller of the maximum scaling factor MScale and the intensity scaling factor IScale, and further scaling the possible trapping amount PTrap by the full scaling parameter FScale. In practice, the individual scaling factors MScale, IScale, and FScale are used to calculate a composite scaling parameter or factor (CompScale) 622. Specifically, the full scaling factor FScale is multiplied by the smaller of the maximum scaling factor MScale and the intensity scaling factor IScale, to create the scaling factor CompScale. The possible trapping amount PTrap is then multiplied by the composite scaling factor CompScale to result in an actual trapping amount or factor 624 that is returned as the result of action 524 of FIG. 5. As indicated in FIG. 5, this trapping amount is then subject to transformation in action 526.

Note that the parameters and calculations described above may in some embodiments vary depending on the distance or number of pixels between the target pixel and the neighboring pixel. For example, different values may be specified for the parameters trap_max, iplim, and/or thresh, to be used as a function of the distance between the target pixel and the neighboring pixel. Alternatively, an additional scaling factor might be used in some embodiments, and the additional scaling factor may depend or be based upon the distance between the target pixel and the neighboring pixel.

The image processing system described above is highly configurable to accommodate varying conditions and equipment. The configurable elements described above include the input lookup tables 210, the output lookup table 216, the intensity threshold parameter thresh, the maximum absolute trapping amount parameter trap_max, the maximum relative trapping amount iplim.

Other configurable parameters or options may also be used in certain embodiments. For example, some embodiments may allow color trapping to be globally enabled or disabled, and some embodiments may provide a "black-only" mode in which trapping is performed for only those pixels whose intensity exceeds a configurable black threshold. Some systems may allow configuration regarding the maximum distance between pixels that are considered to be neighboring. For example, trapping might be performed for pixels that are one, two, or more pixels away from the target pixel or color edge.

The configurable parameters result in a number of programmable features:

Trapping may be performed under one or both sides of a color edge.
Trapping may extend a configurable number of pixels from an edge.
Trapping may be limited to black target pixels.
A maximum trapping amount may be specified.
Per-plane lookup tables can be configured for translation of color magnitude to color intensity.
Relative change in original intensity can be limited.
Configurable threshold at which two intensities are considered equal.
Output lookup table supports non-linear scaling of computed trap values.

In accordance with various embodiments, an article of manufacture may be provided that includes a storage medium having instructions stored thereon that, if executed, result in the operations described above. In an embodiment, the storage medium comprises some type of non-transitory memory (not shown). In accordance with various embodiments, the article of manufacture may be a computer-readable medium such as, for example, software or firmware.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The description incorporates use of the phrases "in an embodiment," or "in various embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. The logic and functionality described herein may be implemented by any such components.

Although certain embodiments have been illustrated and described herein, a wide variety of alternate and/or equivalent embodiments or implementations calculated to achieve the same purposes may be substituted for the embodiments illustrated and described without departing from the scope of the present disclosure. This application is intended to cover any adaptations or variations of the embodiments discussed herein. Therefore, it is manifestly intended that embodiments in accordance with the present disclosure be limited only by the claims and the equivalents thereof.

What is claimed is:

1. A method of color trapping in an image, the method comprising:
    identifying, in an image, a color edge having (i) a first side and (ii) a second side;
    identifying (i) a first pixel on the first side of the color edge and (ii) a second pixel on the second side of the color edge, wherein (i) the first pixel has a first intensity and (ii) the second pixel has a second intensity, and wherein the first pixel and the second pixel are neighboring pixels; and
    trapping in the first pixel if either (i) the first intensity is greater than the second intensity or (ii) the difference between the first intensity and the second intensity is within a specified threshold,
    wherein trapping in the first pixel comprises scaling a possible trapping amount by a composite scaling parameter, and
    wherein the composite scaling parameter is based at least in part on one or more of:
        (i) a maximum scaling parameter that is based at least in part on a specified maximum absolute trapping amount,
        (ii) an intensity scaling parameter that is based at least in part on a specified maximum relative trapping amount that is evaluated as being relative to the first intensity, and
        (iii) a full scaling parameter that is based at least in part on the difference between the first intensity and the second intensity.

2. The method of claim 1, further comprising calculating the possible trapping amount by summing color plane trapping amounts.

3. The method of claim 1, further comprising:
    calculating the possible trapping amount by summing color plane trapping amounts; and
    calculating the color plane trapping amount corresponding to a given color plane by finding the maximum of (i) zero and (ii) the intensity in the given color plane of the second pixel minus the intensity in the given color plane of the first pixel.

4. The method of claim 1, further comprising:
    if the second intensity is greater than the specified maximum relative trapping amount of the first intensity, setting the intensity scaling parameter equal to the specified maximum relative trapping amount of the first intensity divided by the second intensity; and
    if the second intensity is less than the specified maximum relative trapping amount of the first intensity, setting the intensity scaling parameter equal to 1.

5. The method of claim 1, further comprising:
    if the possible trapping amount is greater than the specified maximum absolute trapping amount, setting the maximum scaling parameter to the specified maximum trapping amount divided by the possible trapping amount.

6. The method of claim 1, further comprising:
if the first intensity is greater than the second intensity, setting the full scaling parameter equal to 1; and
if the first intensity is less than the second intensity, (i) determining a difference between the second intensity and the first intensity and (ii) setting the full scaling parameter equal to the difference divided by the specified threshold.

7. The method of claim 1, further comprising calculating the composite scaling parameter by multiplying the full scaling parameter by the smaller of (i) the maximum scaling parameter and (ii) the intensity scaling parameter.

8. The method of claim 1, further comprising non-linearly transforming the scaled possible trapping amount prior to performing the trapping.

9. The method of claim 1, further comprising transforming the scaled possible trapping amount in accordance with a square law prior to performing the trapping.

10. The method of claim 1, further comprising non-linearly transforming component magnitudes of the first and second pixels to account for human intensity perceptions.

11. A method of color trapping in an image, the method comprising:
identifying, in an image, a color edge having (i) a first side and (ii) a second side;
identifying (i) a first pixel on the first side of the color edge and (ii) a second pixel on the second side of the color edge, wherein (i) the first pixel has a first intensity and (ii) the second pixel has a second intensity, and wherein the first pixel and the second pixel are neighboring pixels;
trapping in the first pixel if either (i) the first intensity is greater than the second intensity or (ii) the difference between the first intensity and the second intensity is within a specified threshold;
non-linearly transforming component magnitudes of the first pixel and the second pixel to account for human intensity perceptions; and
summing the transformed component magnitudes to form the first intensity and the second intensity.

12. The method of claim 1, further comprising:
if the second intensity is greater than the specified maximum relative trapping amount of the first intensity, setting the intensity scaling parameter equal to the specified maximum relative trapping amount of the first intensity divided by the second intensity;
if the second intensity is less than the specified maximum relative trapping amount of the first intensity, setting the intensity scaling parameter equal to 1;
if the possible trapping amount is greater than the specified maximum absolute trapping amount, setting the maximum scaling parameter to the specified maximum trapping amount divided by the possible trapping amount;
if the first intensity is greater than the second intensity, setting the full scaling parameter equal to 1; and
if the first intensity is less than the second intensity, (i) determining a difference between the second intensity and the first intensity and (ii) setting the full scaling parameter equal to the difference divided by the specified threshold.

13. A method of color trapping, the method comprising:
identifying, in an image, a color edge having (i) a first side and (ii) a second side;
identifying (i) a first pixel on the first side of the color edge and (ii) a second pixel on the second side of the color edge, wherein (i) the first pixel has a first intensity and (ii) the second pixel has a second intensity;
adding the trapping intensity to the first pixel if (i) the first intensity is greater than the second intensity or (ii) the difference between the first intensity and the second intensity is within a specified threshold;
limiting the trapping intensity to a specified absolute value;
further limiting the trapping intensity to a specified relative value; and
scaling the trapping intensity by a smoothing parameter that is based at least in part on the difference between the first intensity and the second intensity.

14. A method of color trapping, the method comprising:
identifying, in an image, a color edge having (i) a first side and (ii) a second side;
identifying (i) a first pixel on the first side of the color edge and (ii) a second pixel on the second side of the color edge, wherein (i) the first pixel has a first intensity and (ii) the second pixel has a second intensity;
adding the trapping intensity to the first pixel if (i) the first intensity is greater than the second intensity or (ii) the difference between the first intensity and the second intensity is within a specified threshold;
limiting the trapping intensity to a specified absolute value;
further limiting the trapping intensity to a specified relative value; and
if the first intensity is greater than the second intensity, scaling the trapping intensity by a smoothing parameter that is based at least in part on the difference between the first intensity and the second intensity.

15. A method of color trapping, the method comprising:
identifying, in an image, a color edge having (i) a first side and (ii) a second side;
identifying (i) a first pixel on the first side of the color edge and (ii) a second pixel on the second side of the color edge, wherein (i) the first pixel has a first intensity and (ii) the second pixel has a second intensity;
adding the trapping intensity to the first pixel if the first intensity is greater than the second intensity;
limiting the trapping intensity to a specified absolute value;
further limiting the trapping intensity to a specified relative value; and
non-linearly transforming the trapping intensity prior to adding the trapping intensity.

16. A method of color trapping, the method comprising:
identifying, in an image, a color edge having (i) a first side and (ii) a second side;
identifying (i) a first pixel on the first side of the color edge and (ii) a second pixel on the second side of the color edge, wherein (i) the first pixel has a first intensity and (ii) the second pixel has a second intensity;
adding the trapping intensity to the first pixel if the first intensity is greater than the second intensity;
limiting the trapping intensity to a specified absolute value;
further limiting the trapping intensity to a specified relative value; and
transforming the trapping intensity in accordance with a square law prior to adding the trapping intensity.

17. A method of color trapping, the method comprising:
identifying, in an image, a color edge having (i) a first side and (ii) a second side;
identifying (i) a first pixel on the first side of the color edge and (ii) a second pixel on the second side of the color edge, wherein (i) the first pixel has a first intensity and (ii) the second pixel has a second intensity;
adding the trapping intensity to the first pixel if the first intensity is greater than the second intensity;

limiting the trapping intensity to a specified absolute value;
further limiting the trapping intensity to a specified relative value;
non-linearly transforming component magnitudes of the first pixel and the second pixel to account for human intensity perceptions; and
summing the transformed component magnitudes to form (i) the first intensity and (ii) the second intensity.

18. A system-on-chip (SOC) comprising:
edge identification logic configured to identify a color edge in an image;
pixel trapping logic configured to perform color trapping of a first pixel of the image with respect to a second pixel of the image, wherein the first pixel and the second pixel are on different sides of the identified color edge; and
one or more look-up tables that are dynamically configurable to transform component color magnitudes of the first and second pixels,
wherein the pixel trapping logic is configured to
identify (i) a first composite intensity and (ii) a second composite intensity corresponding to the first pixel and the second pixel, respectively, wherein the first composite intensity and the second composite intensity are based at least in part on the transformed component color magnitudes of the first pixel and the second pixel, respectively,
add a trapping intensity to the first pixel if the first composite intensity is greater than the second composite intensity,
limit the trapping intensity to a configurable absolute value, and
further limit the trapping intensity to a configurable relative value.

19. The SOC of claim 18, wherein the pixel trapping logic is further configured to:
add the trapping intensity to the first pixel if the difference between the first composite intensity and the second composite intensity is within a specified threshold; and
scale the trapping intensity by a smoothing parameter that is based at least in part on the difference between the first composite intensity and the second composite intensity.

20. The SOC of claim 18, wherein the pixel trapping logic is further configured to:
add the trapping intensity to the first pixel if the difference between the first composite intensity and the second composite intensity is within a specified threshold; and
if the first composite intensity is greater than the second composite intensity, scale the trapping intensity by a smoothing parameter that is based at least in part the difference between the first composite intensity and the second composite intensity.

21. The SOC of claim 18, further comprising one or more look-up tables configured to non-linearly transform the trapping intensity.

22. The SOC of claim 18, further comprising one or more look-up tables configured to transform the trapping intensity in accordance with a square-based function.

23. The SOC of claim 18, further comprising one or more look-up tables configured to transform the trapping intensity in accordance with an increasing-slope function.

* * * * *